(12) United States Patent
Dryfoos et al.

(10) Patent No.: US 7,552,305 B2
(45) Date of Patent: Jun. 23, 2009

(54) DYNAMIC AND REAL-TIME MANAGEMENT OF MEMORY

(75) Inventors: Robert O. Dryfoos, Hopewell Junction, NY (US); Jason A. Keenaghan, Wappingers Falls, NY (US); Michael J. Shershin, III, Poughkeepsie, NY (US); Kenneth H. Warner, Brookfield, CT (US)

(73) Assignee: International Business Machines Corporation, Armonk, NY (US)

( * ) Notice: Subject to any disclaimer, the term of this patent is extended or adjusted under 35 U.S.C. 154(b) by 186 days.

(21) Appl. No.: 11/258,302

(22) Filed: Oct. 25, 2005

(65) Prior Publication Data

US 2007/0094473 A1    Apr. 26, 2007

(51) Int. Cl.
  *G06F 12/00*  (2006.01)
  *G06F 13/00*  (2006.01)
  *G06F 13/28*  (2006.01)
  *G06F 9/26*  (2006.01)
  *G06F 9/34*  (2006.01)

(52) U.S. Cl. ................ 711/170; 711/153; 711/154; 711/173; 711/210

(58) Field of Classification Search ................ 711/170
See application file for complete search history.

(56) References Cited

U.S. PATENT DOCUMENTS

| 5,355,469 | A | 10/1994 | Sparks et al. ............... 395/575 |
| 5,559,980 | A | 9/1996 | Connors et al. ............. 395/427 |
| 6,035,426 | A | 3/2000 | Applegate .................... 714/54 |
| 6,125,430 | A | 9/2000 | Noel et al. .................. 711/152 |
| 6,816,956 | B1 | 11/2004 | Benayon et al. ............. 711/170 |
| 6,934,755 | B1 | 8/2005 | Saulpaugh et al. .......... 709/226 |
| 2002/0099918 | A1 | 7/2002 | Avner et al. ................. 711/170 |
| 2004/0060041 | A1 | 3/2004 | Demsey et al. ............. 717/151 |
| 2005/0188164 | A1 | 8/2005 | Ballantyne et al. .......... 711/159 |

OTHER PUBLICATIONS

Tsiodras, Thanassis, Heap Check 1.2, Feb. 2, 2002 Available at: http://web.archive.org/web/20020202030317/http://www.softlab.ntua.gr/~ttsiod/HeapCheck.html.*

* cited by examiner

*Primary Examiner*—Kevin L Ellis
*Assistant Examiner*—Ryan Bertram
(74) *Attorney, Agent, or Firm*—Geraldine D. Monteleone, Esq.; Blanche E. Schiller, Esq.; Heslin Rothenberg Farley & Mesiti P.C.

(57) ABSTRACT

Dynamically allocated memory is managed in real-time. This real-time management capability enables an invalid access of the dynamically allocated memory to be detected at the time the invalid access occurs, rather than at some later point in time. This real-time management capability can be dynamically activated/deactivated on a per process basis.

20 Claims, 8 Drawing Sheets

DYNAMIC AND REAL-TIME MANAGEMENT OF MEMORY

TECHNICAL FIELD

This invention relates, in general, to managing memory of a processing environment, and in particular, to facilitating the dynamic management of dynamically allocated memory, such as heap memory, of the processing environment in real-time.

BACKGROUND OF THE INVENTION

Operating systems provide mechanisms for applications to dynamically obtain memory resources used during processing. Frequently, such memory storage is referred to as dynamic heap memory, or heap memory. Some programming languages, including C and C++, provide application programming interfaces (APIs) that allow applications to request and return heap memory from and to the operating system. These APIs include malloc, calloc, realloc, and free. A common problem involved with the usage of heap memory involves program errors that may occur which overwrite portions of the heap memory which are not intended to be written into (i.e., "heap corruption"). Furthermore, the problem exists where applications may continue to access units of heap memory after having returned this memory to the operating system.

Many different solutions have evolved for verifying the integrity of the heap memory once it has been allocated. For example, one prior solution involves placing integrity keys before and after each unit of heap memory that is allocated. These keys contain re-creatable patterns that must be compared at some point in time in order to determine if an overwrite has occurred. Techniques for comparing the keys include having wrapper functions, which are called before and after the regular heap APIs. It is the responsibility of these wrappers to validate the keys for every unit of heap memory allocated, on every heap API that is called. Not only is this inefficient, it only allows the corruption to be detected between two heap APIs being called.

In another solution, the integrity keys are interrogated by an independent thread running from within the same process. While this removes the restriction that the corruption be detected between two heap API calls, there is still a latency between the time that the corruption occurs and the time it is detected.

Although various techniques have been provided for verifying the integrity of heap memory, none of the previous techniques offers an efficient mechanism for detecting corruption in real-time. Thus, a need exists for a technique that enables the detection of memory corruption in real-time. A further need exists for an enhanced capability that enables dynamic and real-time management of heap memory, as well as other dynamically allocated memory.

SUMMARY OF THE INVENTION

The shortcomings of the prior art are overcome and additional advantages are provided through the provision of a method of facilitating management of dynamically allocated memory. The method includes, for instance, having a dynamically allocated memory buffer; and determining in real-time that an invalid access of the dynamically allocated memory buffer has occurred.

System and computer program products corresponding to the above-summarized method are also described and claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

BEST MODE FOR CARRYING OUT THE INVENTION

In accordance with an aspect of the present invention, a capability is provided for dynamically managing dynamically allocated memory in real-time. For instance, an invalid access of the dynamically allocated memory is detected at the time the invalid access occurs, rather than at some later point in time. As a further example, attempted access of previously freed memory is detected at the time the attempt occurs, instead of at some later point in time. This enables the instruction in error to be readily identified and facilitates prevention of memory corruption.

Figure 1:
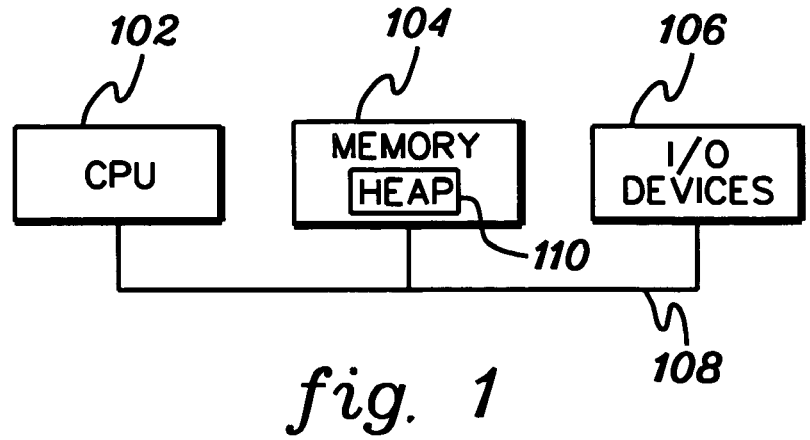
FIG. 1 depicts one embodiment of a processing environment to incorporate and use one or more aspects of the present invention.

One embodiment of a processing environment to incorporate and use one or more aspects of the present invention is described with reference to FIG. 1. A processing environment 100 includes, for instance, a central processing unit 102, a memory 104, and one or more input/output (I/O) devices 106 coupled to one another via, for example, one or more buses or other connections 108.

As one example, processing environment 100 includes a zSeries processor executing a z/TPF operating system, offered by International Business Machines Corporation, Armonk, N.Y. Further, in one example, memory 104 is main memory and it includes a common pool of free memory, which is dynamically allocated and used by programs. This common pool of memory is, in one example, a range of virtual memory dynamically backed by physical memory, as needed. One example of this common pool of memory is heap memory 110. Although the embodiments described herein refer to heap memory or heap buffers, one or more aspects of the present invention are applicable and usable with other types of dynamically allocated memory. Heap memory is only one example.

In accordance with an aspect of the present invention, heap memory 110 is managed dynamically and in real-time. This management has various aspects associated therewith including, for instance, the ability to detect in real-time an invalid access and/or corruption (i.e., actual corruption or potential corruption) of heap memory; the ability to dynamically turn on and off this capability (referred to herein as heapcheck) system wide; and the ability to control whether or not an individual process is to run in this mode.

In order to enable a system to begin operating in the real-time heap checking mode of the present invention, a mechanism is used to set a default environment variable to indicate that heap checking is to be used. Examples of this mechanism include using a command entered at a primary console; exporting an environment variable to a user profile; etc. Then, when a new process is created in the system, the heapcheck setting of the system is inherited by the process. If the default heapcheck setting is altered in the system, existing processes continue to operate with the original heapcheck setting, while newly created processes inherit the heapcheck setting of the system.

When an individual process is running with heap checking mode active, the normal heap memory allocation and deallocation routines (referred to herein as the malloc service routine and the free service routine, respectively) are replaced with alternative routines. The operation of these alternative routines is described below.

Figure 2A:
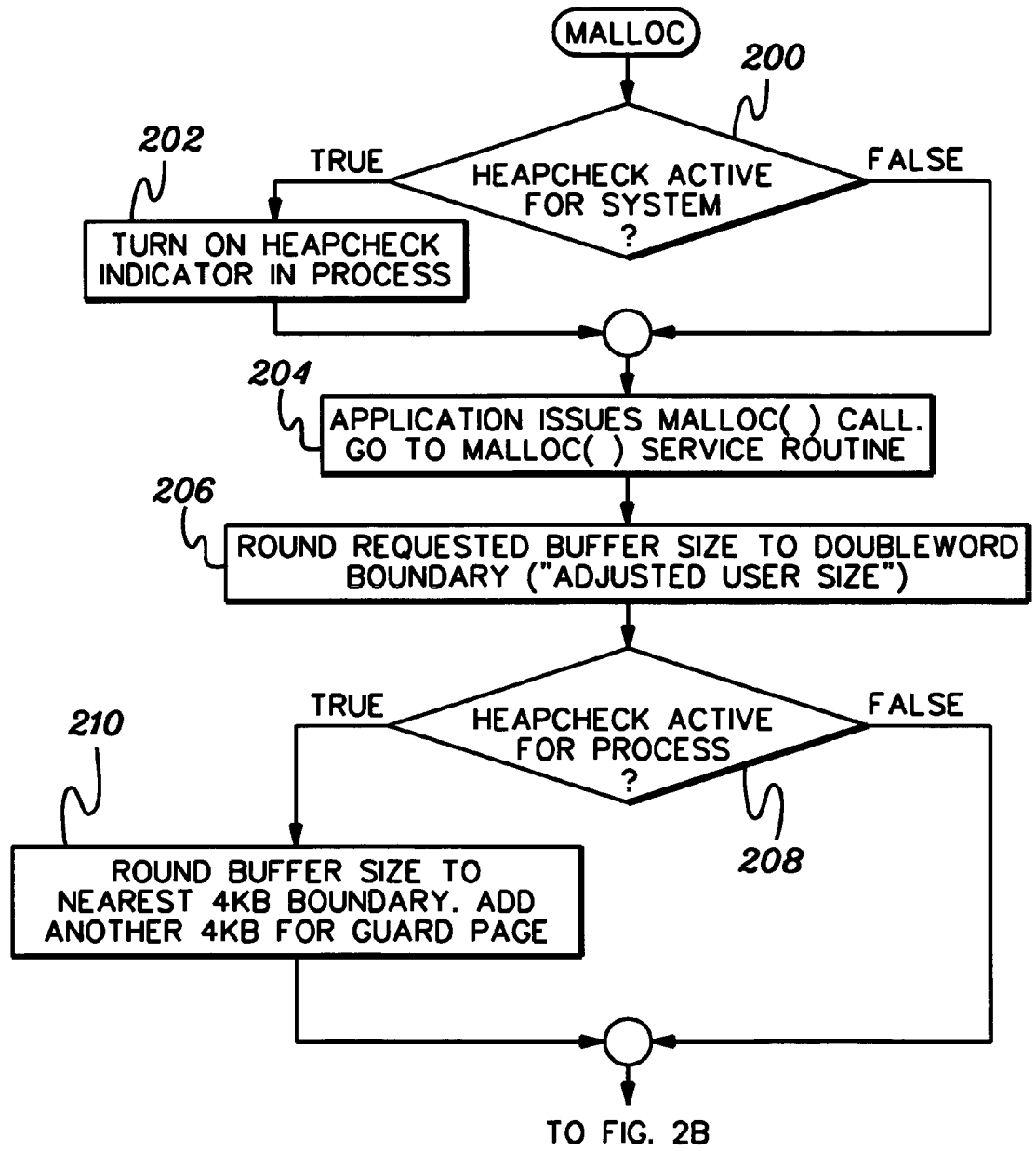
FIGS. 2a-2b depict one embodiment of the logic associated with performing a memory allocation request, in accordance with an aspect of the present invention.
Figure 2B:
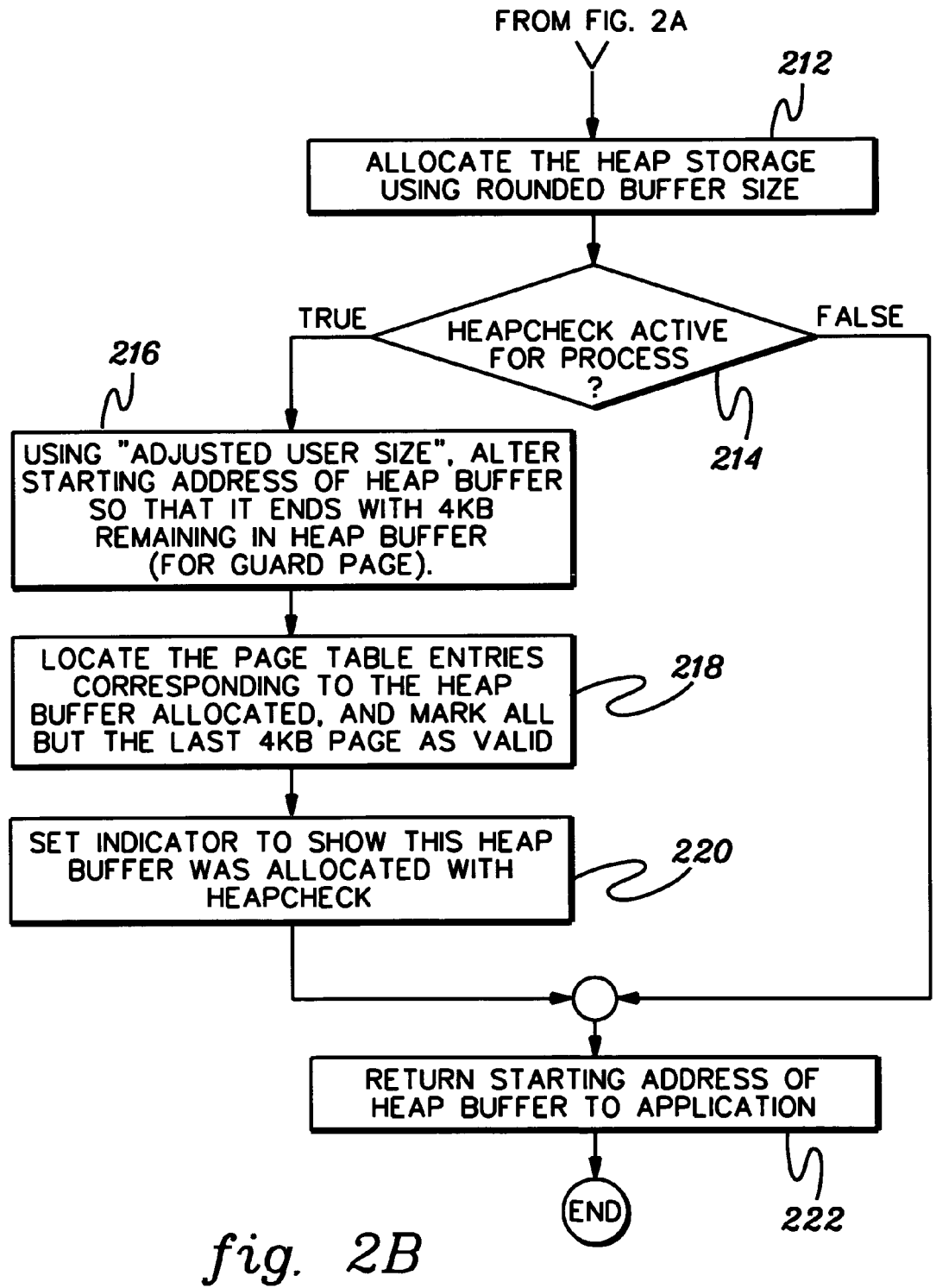

Referring to FIGS. 2a-2b, the logic associated with processing a memory allocation request, such as a malloc request, in accordance with an aspect of the present invention, is described in detail. In one example, this processing is performed by, for instance, an operating system, unless otherwise indicated.

Initially, a determination is made as to whether heapcheck is active for the system, INQUIRY 200 (FIG. 2a). In one example, this determination is made by checking a variable within the system that indicates whether the heapcheck facility is available. If heapcheck is active for the system, then a heapcheck indicator is set in the process for which the buffer is being allocated, STEP 202. This includes, for instance, setting a flag or variable within the process itself.

Subsequent to setting the heapcheck indicator or if heapcheck is not active for the system, an application (executed by the process) issues a malloc call invoking a malloc service routine, STEP 204. Included within the call is a user requested buffer size indicating the amount of dynamically allocated memory desired. This requested user buffer size is rounded to a doubleword boundary, in one example, and the rounded requested buffer size is referred to as the adjusted user size, STEP 206.

Thereafter, a determination is made as to whether heapcheck is active for this process, INQUIRY 208. If heapcheck is active for the process, then in accordance with an aspect of the present invention, the adjusted user buffer size is rounded to a nearest 4 kilobytes (4 KB) boundary and an additional 4 KB of memory is added as a guard page, STEP 210.

Figure 3:
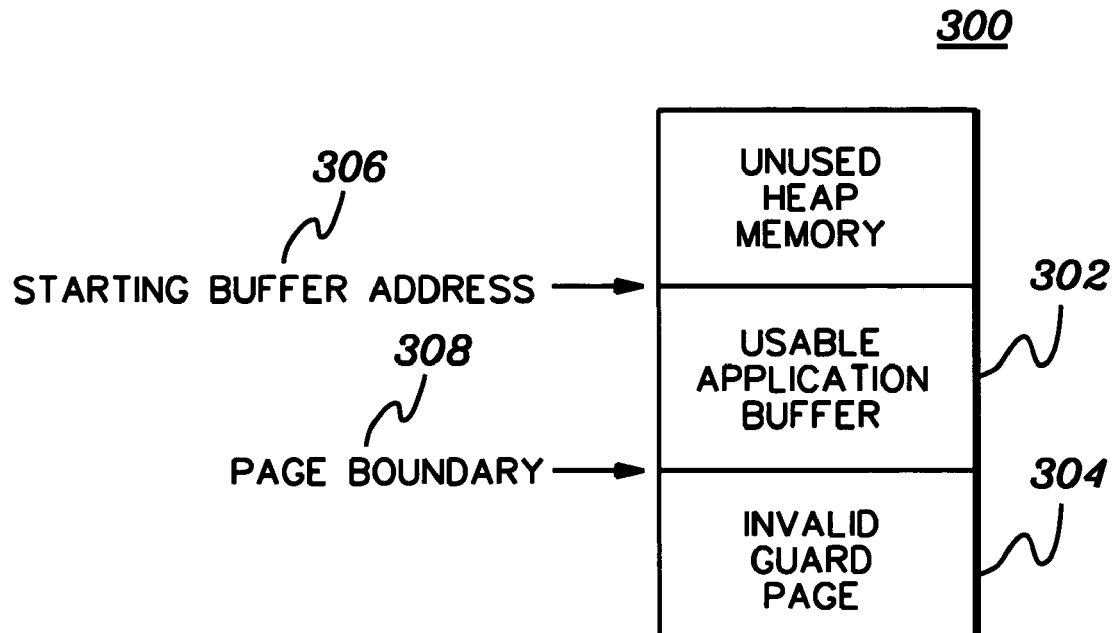
FIG. 3 is a pictorial illustration of a heap buffer allocated in accordance with an aspect of the present invention.

The guard page includes a predefined amount of memory (e.g., 4 KB) that is unusable by the application. For instance, as shown in FIG. 3, an allocated heap buffer 300 includes a defined amount of buffer memory 302 usable by an application requesting the memory and another defined amount of buffer memory 304 that is unusable by the application. This unusable portion is referred to herein as the guard page. Although the guard page is 4 KB in this example, it can be any desired size. The size of 4 KB is only one example.

Subsequent to generating the appropriate buffer size or if heapcheck is not active for the process, processing continues with allocating the heap storage using the rounded buffer size, STEP 212 (FIG. 2b). The rounded buffer size is either the size generated in STEP 210 that includes the guard page or the size generated in STEP 206 depending on whether heapcheck is active. The allocation is performed using the dynamic memory allocation routine of the operating system. Any allocation technique is usable.

Next, another determination is made as to whether heapcheck is active for the process, INQUIRY 214. If it is active for the process, then the starting address of the heap buffer is adjusted using the adjusted user size, so that the usable portion of the buffer ends with 4 KB remaining in the heap buffer, which is the guard page. This is depicted in FIG. 3, in which usable application buffer portion 302 has a starting address 306 that causes the usable buffer to end at a page boundary 308, which is the start of the invalid guard page.

Returning to FIG. 2b, the page table entries corresponding to the heap buffer are located and all the pages, except for the last page, which corresponds to the guard page, are marked as valid, STEP 218. This is assuming that all of the pages are marked as invalid until a heap buffer is actually allocated. In other embodiments, this may not be so. In one example, to mark a page as valid, an invalid indicator in a page table entry corresponding to that page is set off. Details regarding one example of a page table and page table entries are described in "z/Architecture Principles of Operation", IBM Publication No. SA22-7832-04, Fifth Edition (September 2005), which is hereby incorporated herein by reference in its entirety.

In addition to the above, an indicator is set to show that this heap buffer was allocated with heapcheck, STEP 220. In one example, this includes setting an indicator in a control table entry corresponding to this buffer. In another example, the indicator is included in a header/trailer of the buffer. The manner in which this indicator is implemented is dependent, in one embodiment, on the allocation technique used to allocate the buffer.

Subsequent to setting the indicator, or if the heapcheck is not active for this processing, the starting address of the heap buffer is returned to the application, STEP 222. The starting address is the altered address, if heapcheck is active for the process, or the unaltered address, if heapcheck is inactive. This concludes processing of a malloc request, in accordance with an aspect of the present invention.

One or more of the steps described above are dependent upon the system implementing the support. For example, in STEP 206, the requested buffer size is rounded to a doubleword boundary. This is in support of those systems that desire that all buffers be allocated on doubleword boundaries. However, other systems may not have such a requirement, and therefore, this step may not be performed or may be performed differently.

The capability described herein is usable with any heap allocation technique. Further, other types of requests, such as calloc and realloc, may be performed similarly to the logic described above with the malloc request. Examples of allocation routines are described in a publication by P. Wilson et al., entitled "Dynamic Storage Allocation: A Survey and Critical Review", University of Texas at Austin, Department of Computer Sciences, pages 1-78 (September 1995), which is hereby incorporated herein by reference in its entirety. Additionally, examples of malloc, calloc, realloc and free (described below) are described in The Open Group Base Specifications Issue 6, IEEE Std 1003.1, 2004 Edition, which is hereby incorporated herein by reference in its entirety.

As described above, when the heapcheck capability is active, additional memory is used. Consequently, there may be situations in which it is beneficial to remove a process from heapcheck. In accordance with an aspect of the present invention, the heapcheck capability can be dynamically activated/deactivated on a per process basis. One embodiment of the logic associated with dynamically deactivating heapcheck for a particular process is described with reference to FIGS. 4a-4b. Similar to the allocate logic, this logic is performed by, for instance, the operating system managing the process, unless otherwise noted.

Figure 4A:
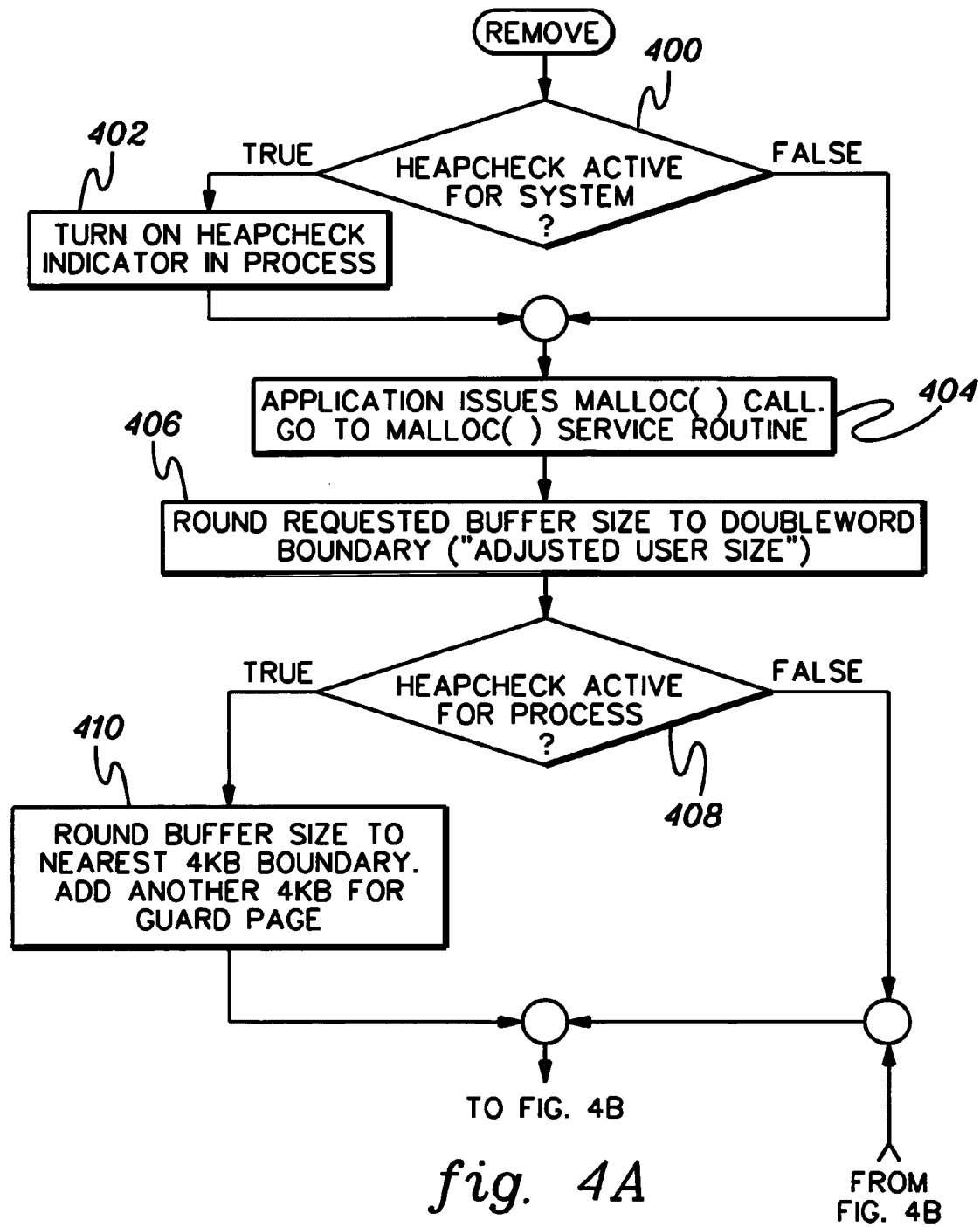
FIGS. 4a-4b depict one embodiment of the logic associated with dynamically disabling the heapcheck capability of the present invention, in accordance with an aspect of the present invention.
Figure 4B:
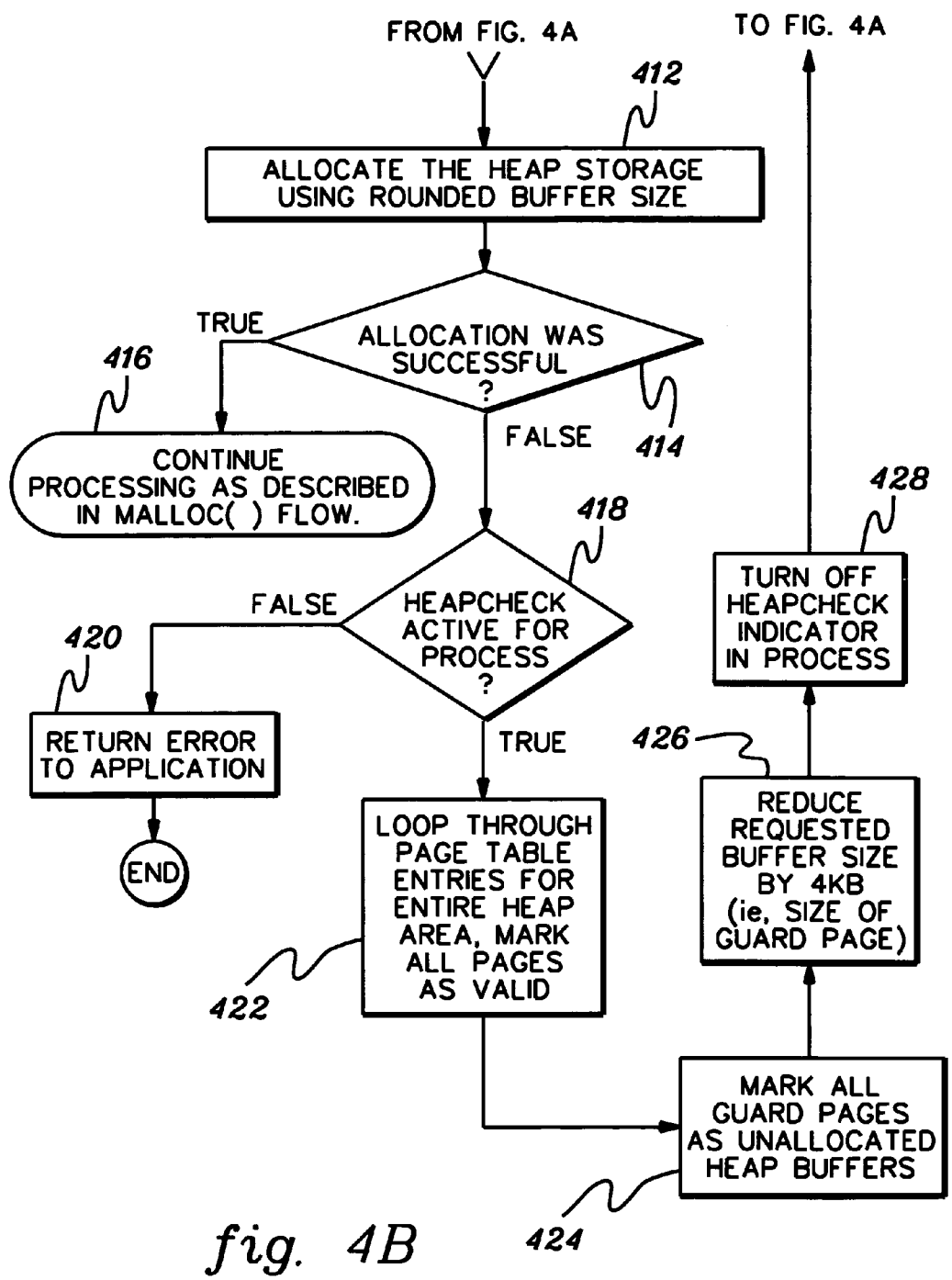

Referring to FIG. 4a, initially, a determination is made as to whether heapcheck is active for the system, INQUIRY 400. If heapcheck is active for the system, then a heapcheck indicator is set in the process, STEP 402. Thereafter, or if heapcheck is not active for the system, processing continues with the application issuing a malloc call that invokes a malloc service routine, INQUIRY 404, and with rounding the user requested buffer size specified in the malloc call to a doubleword boundary, STEP 406.

Subsequently, a determination is made as to whether heapcheck is active for this process, INQUIRY 408. If heapcheck is active for the process, then the adjusted user buffer size is rounded to the nearest 4 KB boundary and another 4 KB of memory is added as the guard page, STEP 410. Thereafter, or if heapcheck is not active for this process, heap storage is allocated using the rounded buffer size, STEP 412 (FIG. 4b), as described above.

A determination is then made as to whether the allocation was successful, INQUIRY 414. If the allocation was successful, then processing continues as described above, STEP 416. In particular, processing continues with INQUIRY 214 of FIG. 2b. However, if the allocation was unsuccessful, then another determination is made as to whether heapcheck is active for this process, INQUIRY 418. If heapcheck is not active for this process, then an error is returned to the application, STEP 420. Otherwise, if heapcheck is active for this process, then processing continues with marking the pages of the heap area associated with this process valid. Specifically, as one example, the operating system assigns a portion of memory, referred to as a heap area, to the process, and the process allocates buffers (i.e., units of memory) from that area. To validate the pages of this area, the page table entries are looped through for the entire heap area and all the pages are marked as valid, STEP 422. Additionally, the guard pages for any allocated buffers of this process are marked as unallocated heap buffers, STEP 424. This is accomplished by, for instance, setting an indicator in one or more control table entries.

Thereafter, the requested buffer size is reduced by the size of the guard page (e.g., 4 KB), STEP 424, and the heapcheck indicator is turned off in the process, STEP 426. Processing then continues with another attempt to allocate the heap storage using the rounded buffer size, which in this case does not include the additional space for the guard page, STEP 412. When the heapcheck indicator is turned off, this individual process is not running in heapcheck mode, and thus, subsequent allocation requests are processed in non-heapcheck mode.

Figure 5:
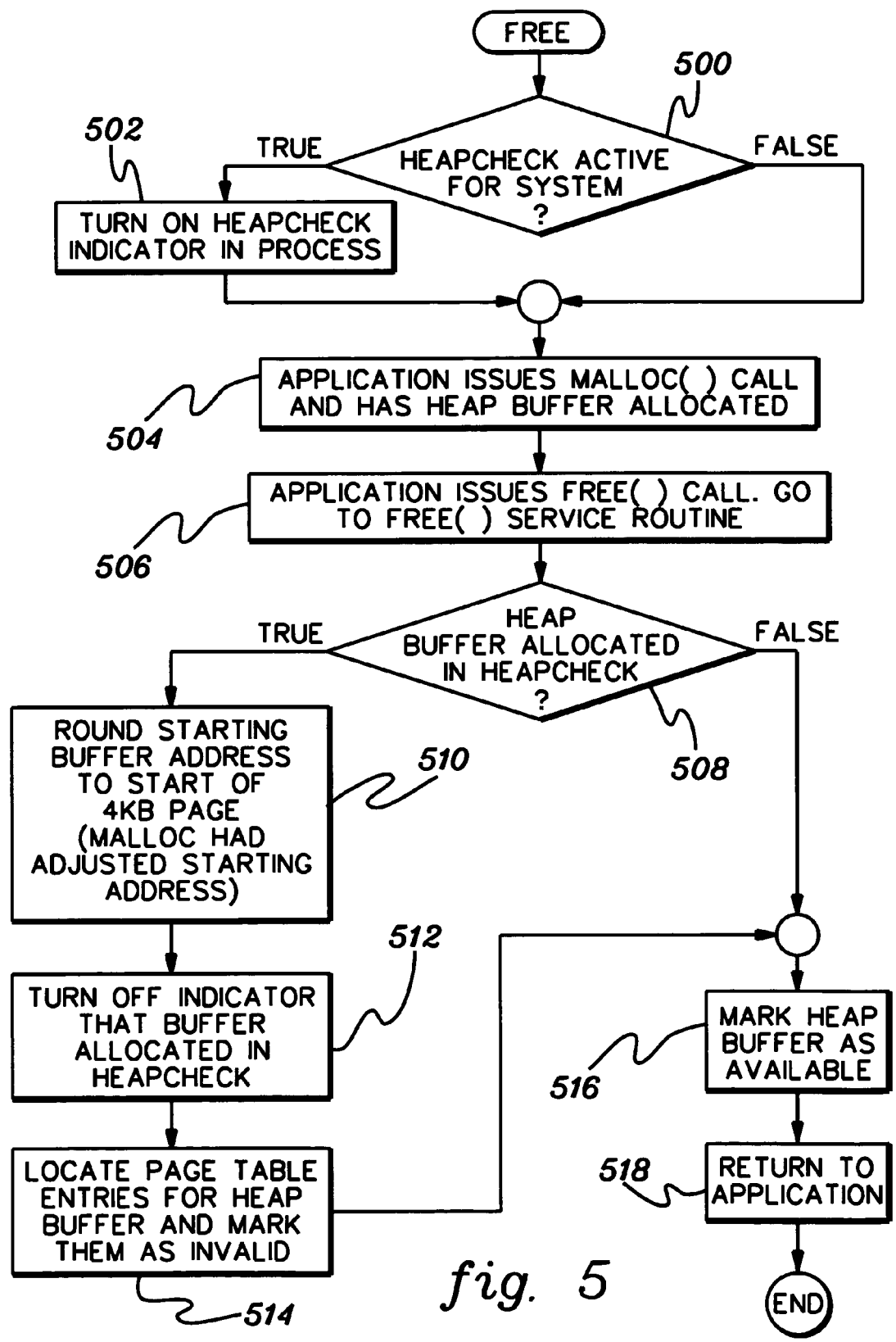
FIG. 5 depicts one embodiment of the logic associated with processing a request to free allocated memory, in accordance with an aspect of the present invention.

In addition to allocating memory, memory is also freed. One embodiment of the logic associated with a free request is described with reference to FIG. 5. Similar to the other requests, the logic of the free request is performed by, for instance, the operating system unless otherwise stated.

Initially, a determination is made as to whether heapcheck is active for the system, INQUIRY 500. If heapcheck is active for the system, then the heapcheck indicator in the process is set, STEP 502. Thereafter, or if heapcheck is not active for the system, heap memory is allocated, in response to a request by an application, as described above, STEP 504.

At some point later in time, the application issues a free call invoking a free service routine, STEP 506. The free call specifies the heap buffer to be freed. A determination is made as to whether the heap buffer was allocated in heapcheck, INQUIRY 508. If the buffer is allocated in heapcheck, the starting buffer address is rounded to the start of a 4 KB page, since malloc had adjusted the starting address (in STEP 216 of FIG. 2b), STEP 510. Additionally, the indicator indicating that the buffer is allocated in heapcheck is turned off, STEP 512, and the page table entries for the heap buffer are located and marked as invalid, STEP 514.

Thereafter, or if the heap buffer is not allocated in heapcheck, the heap buffer is marked as available, STEP 516, and processing returns to the application, STEP 518.

Figure 6:
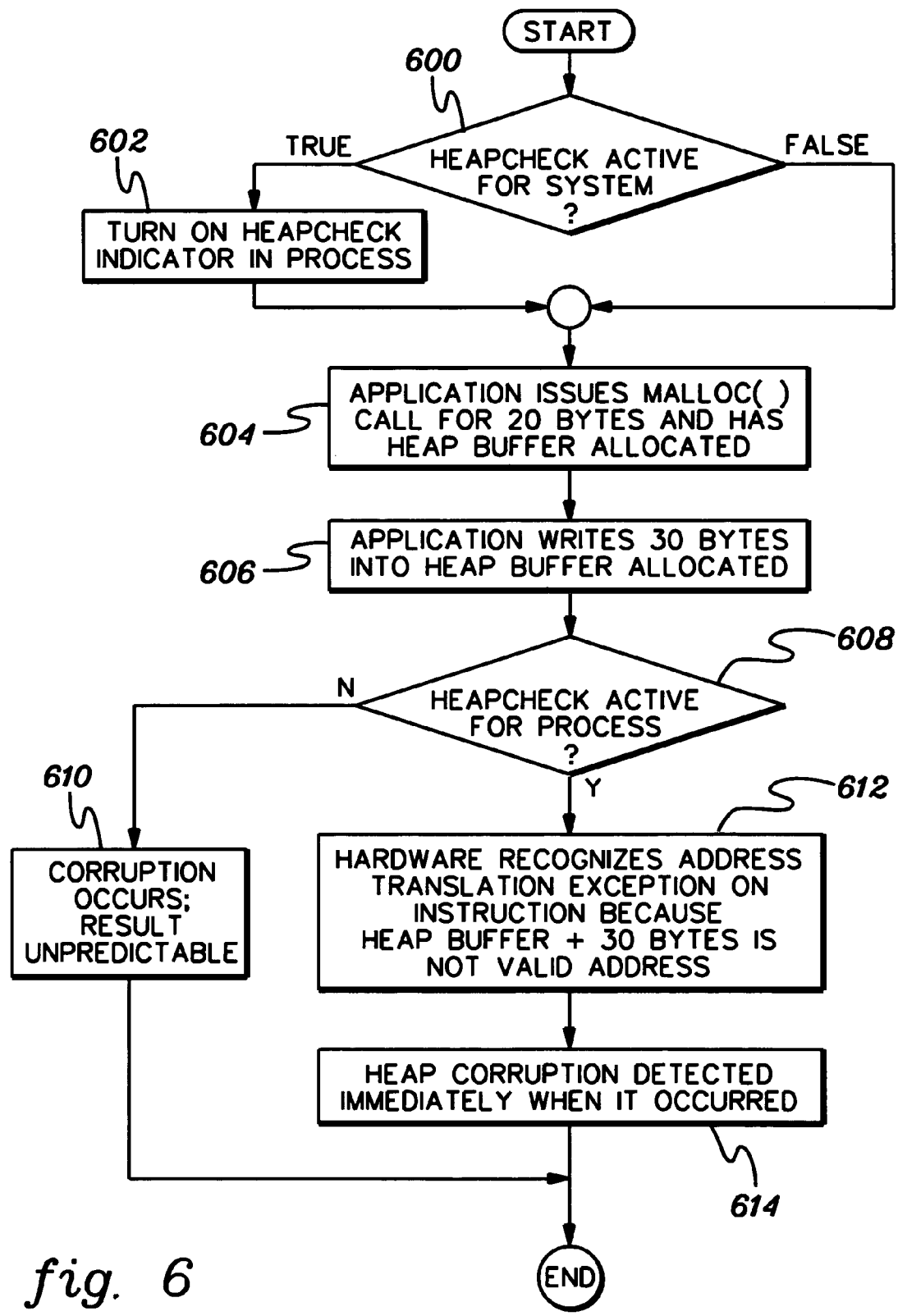
FIG. 6 depicts one embodiment of the logic associated with managing an attempt by an application to access memory beyond the end of the allocated heap buffer, in accordance with an aspect of the present invention.

There are situations in which an application may attempt access beyond the end of an allocated heap buffer. Processing associated with this attempt is described with reference to FIG. 6. This processing is performed by, for instance, the operating system, unless otherwise noted.

Initially, a determination is made as to whether heapcheck is active for the system, INQUIRY 600. If heapcheck is active for the system, then a heapcheck indicator in the process is set, STEP 602. Subsequent to turning on the heapcheck indicator or if heapcheck is not active for the system, processing continues with the application issuing a malloc call for a defined amount of memory, STEP 604. For instance, the application issues a malloc call for 20 bytes of memory and has the heap buffer allocated, as described above.

Although the buffer is 20 bytes, the application attempts to write 30 bytes into the heap buffer, STEP 606. Should heapcheck be inactive, INQUIRY 608, then corruption occurs and detection of this corruption, if at all, does not occur until some later point in time, which may lead to application errors/failure, STEP 610. In contrast, if heapcheck is active, INQUIRY 608, then in accordance with an aspect of the present invention, the hardware (e.g., processor) recognizes an address translation exception on the instruction (of the application) being processed, since the heap buffer plus 30 bytes is not a valid address, STEP 612. Thus, the invalid access and potential heap corruption is detected immediately when it occurred (i.e., in real-time), STEP 614.

Figure 7:
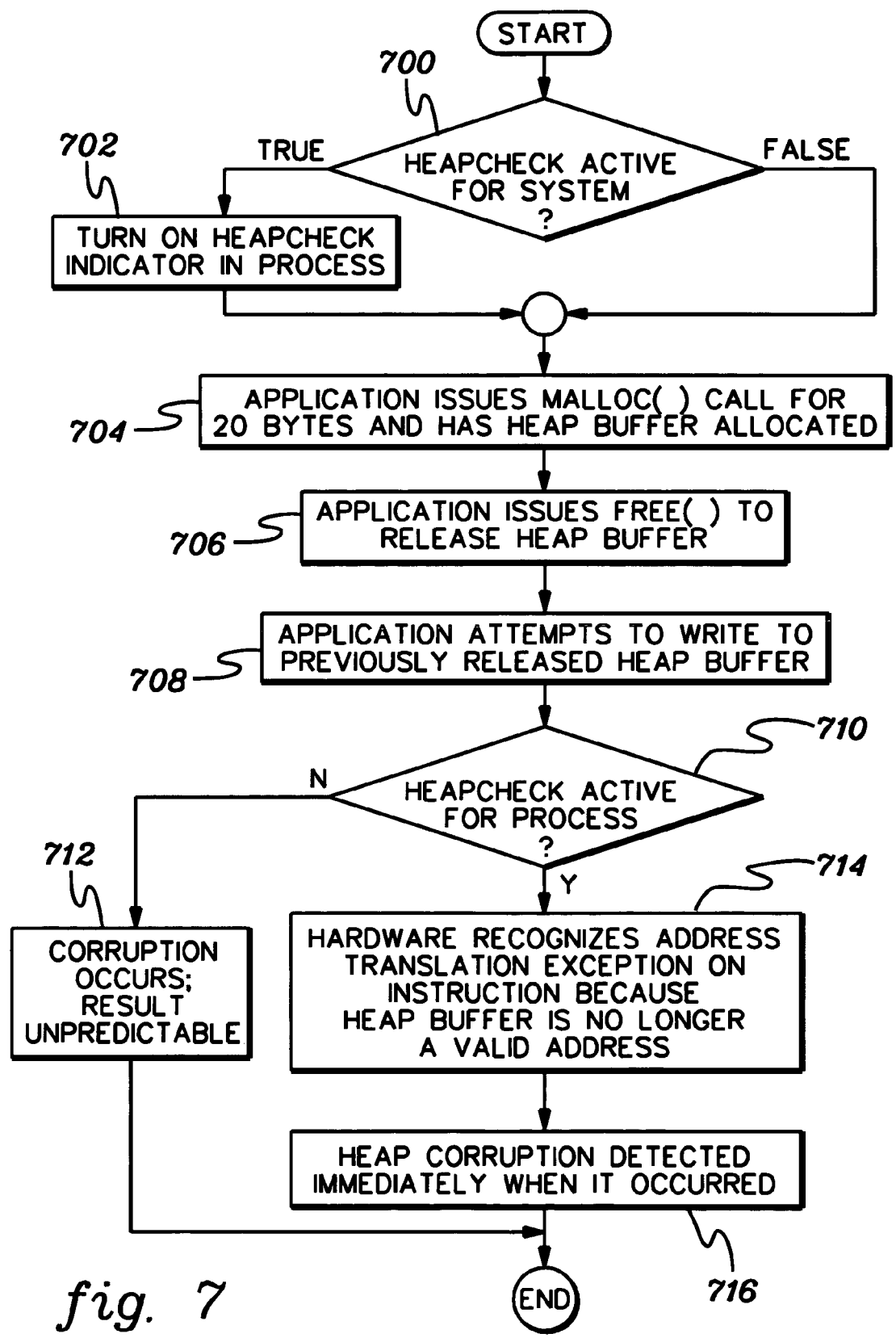
FIG. 7 depicts one embodiment of the logic associated with managing an attempt by an application to access a released heap buffer, in accordance with an aspect of the present invention.

In addition to the above, an application may attempt to access a released heap buffer. One embodiment of the logic associated with this processing is described with reference to FIG. 7. This processing is performed, for instance, by the operating system, unless otherwise noted.

Initially a determination is made as to whether heapcheck is active for this system, INQUIRY 700. Should heapcheck be active for this system, then the heapcheck indicator in the process is turned on, STEP 702. Thereafter, or if heapcheck is not active for the system, processing continues with the application issuing a malloc call for a certain amount of bytes, e.g., 20 bytes, and the heap buffer is allocated, STEP 704. Sometime later, the application issues a free to release the heap buffer, STEP 706.

Thereafter, the application attempts to write to a previously released heap buffer, STEP 708. If heapcheck is inactive for the process, INQUIRY 710, corruption occurs and detection of this corruption, if at all, does not occur until some time after the instruction completes and other processing has continued, which may lead to application errors/failure, STEP 712. However, if heapcheck is active, the hardware recognizes the address translation exception on the instruction being processed, since the heap buffer is no longer a valid address, STEP 714. Once again, the invalid access and potential heap corruption is detected immediately when it occurred (i.e., in real-time), STEP 716.

Described in detail above is a capability that provides dynamic management of dynamically allocated memory, such as heap memory, in real-time. Advantageously, a capability is provided that enables the ability to detect an invalid memory access and/or memory corruption (potential or actual) at the exact moment (e.g., program instruction) when the invalid memory access and/or memory corruption occurred. This removes the ambiguity involved in determining the program code responsible for causing the corruption. The capability allows detection of invalid memory accesses due to an overwrite or due to the release of the requested memory. The memory checking mode of the system can be activated in real-time and does not require a special recompiling, linking or loading of application programs. Further, the memory checking can be activated/deactivated on a per process basis. Yet further, the memory checking can be implemented as part of any memory allocator technique that is implemented by the system (e.g., best fit, first fit, binning, etc.).

Advantageously, one or more aspects of the present invention provides a capability for establishing a system-wide memory checking mode that can be used to detect application programming errors involved with the usage of memory. In one or more aspects, virtual addressing is used to invalidate pages of memory immediately following memory buffers which have been allocated for application use. Because these invalid pages cannot be successfully translated via the system's normal virtual address translation mechanism, any buffer overwrite situations or attempts to access the areas of memory immediately following the allocated memory results in address translation exceptions. Further, areas of the memory which have never been allocated or have been allocated and later released by the application are also invalidated in the virtual address space to further detect application errors in attempting to access memory that is not currently in use.

Although examples are provided herein, these are just examples and many variations to the examples can be made without departing from the spirit of the present invention. For example, other types of allocation routines may be used and incorporate one or more aspects of the present invention. Further, routines other than those mentioned herein can incorporate and use one or more aspects of the present invention.

Although rounding to a doubleword boundary is employed, this is only in one implementation. Other implementations may forego this. Additionally, the rounding of the requested amount to a page boundary in which the page is 4,096 bytes is just one example. Other defined amounts may be used. As examples, a page may be other than 4,096 bytes; the rounding can be to a unit other than a page; etc. Further, the use of 4 KB memory as a guard page is only one example. Other amounts of memory may be used as the guard page. As one example, the size of the guard page corresponds to the size of addressable units of memory employed by the virtual address translation mechanism of the system.

In addition to the above, the environment to incorporate and use one or more aspects of the present invention can be different than that described above. For example, it can be a different computing environment and/or the operating system may be other than TPF. Additionally, although C and C++ programs are described, other types of programs can benefit from one or more aspects of the present invention. Yet further, a buffer is any unit of memory.

Again, advantageously, corruption (potential or actual) is detected at the time it occurs; illegal accesses to released memory are detected; memory checking can be dynamically enabled/disabled without recompiling application or memory management routines; and a process can be dynamically removed from memory checking mode when resources become scarce.

The capabilities of one or more aspects of the present invention can be implemented in software, firmware, hardware or some combination thereof.

One or more aspects of the present invention can be included in an article of manufacture (e.g., one or more computer program products) having, for instance, computer usable media. The media has therein, for instance, computer readable program code means or logic (e.g., instructions, code, commands, etc.) to provide and facilitate the capabilities of the present invention. The article of manufacture can be included as a part of a computer system or sold separately.

Additionally, at least one program storage device readable by a machine embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

Although preferred embodiments have been depicted and described in detail herein it will be apparent to those skilled in the relevant art that various modifications, additions, substitutions and the like can be made without departing from the spirit of the invention and these are therefore considered to be within the scope of the invention as in the following claims.

What is claimed is:

1. A method of facilitating management of dynamically allocated memory, said method comprising:
    allocating a dynamically allocated memory buffer for a process in accordance with an allocation mode of the process that enables the determining in real-time of an invalid access, wherein setting the allocation mode for the process to enable determining in real-time an invalid access is performed in real-time, and wherein the setting sets the allocation mode for an application executed by the process without requiring recompiling, linking or loading of the application to set, in real-time, the allocation mode for the application; and
    determining in real-time that an invalid access of the dynamically allocated memory buffer has occurred.

2. The method of claim 1, wherein the determining in real-time comprises determining the invalid access at a time an instruction causes the invalid access.

3. The method of claim 1, wherein the dynamically allocated memory buffer comprises a first buffer portion accessible by the application of the process and a second buffer portion inaccessible by the application.

4. The method of claim 3, wherein the second buffer portion comprises a page of memory.

5. The method of claim 3, wherein the determining comprises detecting that an instruction of the application requested access to the second buffer portion of the dynamically allocated memory.

6. The method of claim 1, wherein the allocating comprising:
    revising a requested buffer size to provide a revised buffer size, said revised buffer size including a predefined amount of memory added to the requested buffer size; and
    allocating the dynamically allocated memory buffer based on the revised buffer size.

7. The method of claim 6, further comprising defining a starting address of the dynamically allocated memory buffer, said defining altering an initial starting address of the dynamically allocated memory buffer to provide the starting address, wherein the starting address is at a location in which the end of a usable portion of the dynamically allocated memory buffer is a beginning of an inaccessible portion of the dynamically allocated memory buffer.

8. The method of claim 7, further comprising freeing the dynamically allocated memory buffer, said freeing comprising:
   adjusting the starting address of the dynamically allocated memory buffer; and
   marking memory associated with the dynamically allocated memory buffer defined at least by the adjusted starting address as invalid.

9. The method of claim 1, further comprising dynamically activating for the process the allocation mode that enables the determining in real-time of the invalid access, wherein the dynamically activating comprises turning on an indicator in the process to specify that the dynamically allocated memory buffer for the process is to be allocated with additional memory to be used as a guard.

10. The method of claim 1, further comprising:
   detecting that another allocation mode is to be used to allocate one or more buffers for the process; and
   dynamically deactivating the allocation mode that enables the determining in real-time, wherein the dynamically deactivating includes turning off an indicator in the process to deactivate the allocation mode, and wherein another dynamically allocated memory buffer for the process is allocated based on the another allocation mode, said another dynamically allocated memory buffer being allocated without additional memory as a guard.

11. The method of claim 1, wherein the determining comprises determining in response to at least one of an overwrite by an application into a memory location outside of the dynamically allocated memory buffer, and an attempted access of a freed dynamically allocated memory buffer.

12. A system of facilitating management of dynamically allocated memory, said system comprising:
   a processing unit to allocate a dynamically allocated memory buffer for a process in accordance with an allocation mode of the process that enables the determining in real-time of an invalid access, wherein setting the allocation mode for the process to enable determining in real-time an invalid access is performed in real-time, and wherein the setting sets the allocation mode for an application executed by the process without requiring recompiling, linking or loading of the application to set, in real-time, the allocation mode for the application; and
   the processing unit to determine in real-time that an invalid access of the dynamically allocated memory buffer has occurred.

13. The system of claim 12, wherein the allocating comprising:
   revising a requested buffer size to provide a revised buffer size, said revised buffer size including a predefined amount of memory added to the requested buffer size; and
   allocating the dynamically allocated memory buffer based on the revised buffer size.

14. The system of claim 12, wherein the processing unit is adapted to dynamically activate for the process the allocation mode that enables the determining in real-time of the invalid access, wherein the dynamically activating comprises turning on an indicator in the process to specify that the dynamically allocated memory buffer for the process is to be allocated with additional memory to be used as a guard.

15. The system of claim 12, further comprising the processing unit adapted to:
   detect that another allocation mode is to be used to allocate one or more buffers for the process; and
   dynamically deactivate the allocation mode that enables the determining in real-time, wherein the dynamically deactivating includes turning off an indicator in the process to deactivate the allocation mode, and wherein another dynamically allocated memory buffer for the process is allocated based on the another allocation mode, said another dynamically allocated memory buffer being allocated without additional memory as a guard.

16. An article of manufacture comprising:
   at least one computer usable medium having computer readable program code logic to facilitate management of dynamically allocated memory, the computer readable program code logic comprising:
   allocate logic to allocate a dynamically allocated memory buffer for a process in accordance with an allocation mode of the process that enables the determining in real-time of an invalid access, wherein setting the allocation mode for the process to enable determining in real-time an invalid access is performed in real-time, and wherein the setting sets the allocation mode for an application executed by the process without requiring recompiling, linking or loading of the application to set, in real-time, the allocation mode for the application; and
   logic to determine in real-time that an invalid access of a dynamically allocated memory buffer has occurred.

17. The article of manufacture of claim 16, wherein said allocate logic comprises:
   revise logic to revise a requested buffer size to provide a revised buffer size, said revised buffer size including a predefined amount of memory added to the requested buffer size; and
   logic to allocate the dynamically allocated memory buffer based on the revised buffer size.

18. The article of manufacture of claim 17, further comprising define logic to define a starting address of the dynamically allocated memory buffer, the define logic to alter an initial starting address of the dynamically allocated memory buffer to provide the starting address, wherein the starting address is at a location in which the end of a usable portion of the dynamically allocated memory buffer is a beginning of an inaccessible portion of the dynamically allocated memory buffer.

19. The article of manufacture of claim 18, further comprising logic to free the dynamically allocated memory buffer, said logic to free comprising:
   adjust logic to adjust the starting address of the dynamically allocated memory buffer; and
   logic to mark memory associated with the dynamically allocated memory buffer defined at least by the adjusted starting address as invalid.

20. The method of claim 10, wherein the dynamically deactivating is automatically performed in response to an unsuccessful memory allocation.

* * * * *